(12) United States Patent
Zhang

(10) Patent No.: US 9,840,031 B2
(45) Date of Patent: Dec. 12, 2017

(54) HYDRAULIC TIRE VULCANIZING MACHINE CAPABLE OF REALIZING SELF-ADAPTIVE MOLD ADJUSTMENT WITHOUT A SUPPORTING PLATE

(71) Applicant: SINO-ARP TIRES EQUIPMENT TECHNOLOGY (SUZHOU) CO., LTD, Suzhou, Jiangsu (CN)

(72) Inventor: Zhengluo Zhang, Suzhou (CN)

(73) Assignee: SINO-ARP TIRES EQUIPMENT TECHNOLOGY (SUZHOU) CO., LTD, Suzhou, Jiangsu (CN)

(*) Notice: Subject to any disclaimer, the term of this patent is extended or adjusted under 35 U.S.C. 154(b) by 243 days.

(21) Appl. No.: 14/750,498

(22) Filed: Jun. 25, 2015

(65) Prior Publication Data
US 2015/0290843 A1 Oct. 15, 2015

Related U.S. Application Data

(63) Continuation of application No. PCT/CN2013/070892, filed on Jan. 23, 2013.

(30) Foreign Application Priority Data

Dec. 28, 2012 (CN) .......................... 2012 1 0582029

(51) Int. Cl.
*B29C 33/24* (2006.01)
*B29C 35/02* (2006.01)
(Continued)

(52) U.S. Cl.
CPC .......... *B29C 33/24* (2013.01); *B29D 30/0601* (2013.01); *B29L 2030/00* (2013.01)

(58) Field of Classification Search
CPC .................. B29D 30/0601; B29D 30/0605; B29C 33/20; B29C 33/24; B29C 33/307; B29C 33/308; B29L 2030/00
See application file for complete search history.

(56) References Cited

U.S. PATENT DOCUMENTS

| 4,453,902 A | 6/1984 | Imbert |
| 5,194,267 A | 3/1993 | Funakoshi et al. |

(Continued)

FOREIGN PATENT DOCUMENTS

| CN | 2210776 Y | 10/1995 |
| CN | 201009398 Y | 1/2008 |

(Continued)

OTHER PUBLICATIONS

International Written Opinion in English for International Application PCT/CN2013/070892 dated Oct. 10, 2013.*

(Continued)

*Primary Examiner* — Alison L Hindenlang
*Assistant Examiner* — Jerzi H Moreno Hernandez
(74) *Attorney, Agent, or Firm* — Birch, Stewart, Kolasch & Birch, LLP

(57) ABSTRACT

A hydraulic tire vulcanizing machine includes a frame, a cross beam mechanism, a plurality of groups of pulling rods and a mold locking mechanism, and hydraulic oil cylinders. Each pulling rod includes an upper pulling rod unit and a disconnectable lower pulling rod unit. The upper pulling rod unit is fixedly connected to the upper cross beam, and the lower pulling rod unit is equipped through the lower cross beam and the corresponding hydraulic oil cylinder with the mold locking mechanisms being connected to the lower pulling rod units. Each mold locking mechanism includes a driving device, a swing link, a plurality of connectors and at least one ball pin boss in mutual connection. Detection devices are provided for upper and lower pulling rod units connecting position with each of the detection devices include an impactor and a limit switch. The impactor is arranged on the upper pulling rod unit.

15 Claims, 3 Drawing Sheets

(51) Int. Cl.
  *B29D 30/06* (2006.01)
  *B29L 30/00* (2006.01)

(56) References Cited

U.S. PATENT DOCUMENTS

| | | | |
|---|---|---|---|
| 2004/0032057 A1* | 2/2004 | Cole | B29D 30/0601 264/326 |
| 2006/0267248 A1 | 11/2006 | Cole | |

FOREIGN PATENT DOCUMENTS

| | | | |
|---|---|---|---|
| CN | 101229669 A | * | 7/2008 |
| CN | 101229669 A | | 7/2008 |
| CN | 101229669 B | | 6/2010 |
| CN | 202412546 U | * | 9/2012 |
| CN | 202412546 U | | 9/2012 |
| CN | 201498666 U | | 10/2012 |
| CN | 203019589 U | | 6/2013 |
| JP | 57-140139 A | | 8/1982 |
| JP | 4-332607 A | | 11/1992 |
| WO | WO 2010/146554 A1 | | 12/2010 |

OTHER PUBLICATIONS

International Search Report, issued in PCT/CN2013/070892, dated Oct. 10, 2013.
Chinese Office Actions and Search Reports, dated Sep. 6, 2015 and May 17, 2016, for Chinese Application No. 201210582029.6, with English translations of the Office Actions.
Extended European Search Report, dated May 20, 2016, for European Application No. 13868544.1
International Preliminary Report on Patentability and Written Opinion of the International Searching Authority (Forms PCT/IB/373 and PCT/ISA/237), dated Jun. 30, 2015, for International Application No. PCT/CN2013/070892, with an English translation of the Written Opinion
Japanese Office Action and English translation, dated Jul. 5, 2016, for Japanese Application No. 2015-549946.

* cited by examiner

HYDRAULIC TIRE VULCANIZING MACHINE CAPABLE OF REALIZING SELF-ADAPTIVE MOLD ADJUSTMENT WITHOUT A SUPPORTING PLATE

CROSS-REFERENCE TO RELATED APPLICATIONS

This application is a Continuation of PCT International Application No. PCT/CN2013/070892, filed on Jan. 23, 2013, which claims priority under 35 U.S.C. 119(a) to Patent Application No. 201210582029.6, filed in China on Dec. 28, 2012, all of which are hereby expressly incorporated by reference into the present application.

BACKGROUND OF THE INVENTION

1. Field of the Invention

The invention relates to a tire vulcanizing machine. More particularly to a hydraulic tire vulcanizing machine capable of realizing self-adaptive mold adjustment without a supporting plate.

2. Description of Background Art

A hydraulic tire vulcanizing machine is an important and main apparatus used in tire vulcanizing production having a much better accuracy than the traditional mechanical vulcanizing machine. Thus, the hydraulic tire vulcanizing machine is widely applied to the modern production of the tire vulcanization.

The structure of the hydraulic tire vulcanizing machine usually comprises pulling rods and supporting plates. Chinese patent application CN101229669A entitled pull-rod mold-locking hydraulic tire vulcanizing machine discloses a pressurized structure which is comprised of pulling rods, pressurized supporting plates and pressurized oil cylinders. The upper end of each pulling rod is fixedly connected with an upper cross beam with the lower end of each pulling rod being equipped through a lower cross beam and then fixedly connected with the pressurized supporting plate. The pressure oil cylinder is fixed at the bottom of the lower cross beam with a piston having an end which is fixedly connected with the pressurized supporting plate. A working principle of how to exert mold locking force is described as follows. The mold locking force of the pressurized oil cylinder fixed at the bottom of the lower cross beam is applied to an upper mold connected with the upper cross beam by the pressurized supporting plate and the pulling rod, which is to tightly close the upper mold and a lower mold. Therefore, the driving force of the pressurized oil cylinder with the structure as described is totally transmitted by the pressurized supporting plate.

The defects of the structure as described above mainly include first the pressurized supporting plate with the structure as described adds weight to the machine. Thus requiring improved motion synchronization of the pressurized oil cylinder and precision of the holes on the lower cross beam and the supporting plate, and increased cost for production. Second, in the structure as described, the pressurized oil cylinder was arranged between the lower cross beam and the supporting plate, which provides an inconvenience with the pressurized oil cylinders regarding maintenance and replacement, the time and cost of installation and dismounting thus reducing the efficiency for the entire tire vulcanizing process.

SUMMARY AND OBJECTS OF THE INVENTION

With respect to the problems as described above, an embodiment of the present invention is to provide a hydraulic tire vulcanizing machine which can lower the total weight, and reduce the manufacturing cost, and be capable of realizing the self-adaptive mold adjustment without a supporting plate.

To achieve the above objectives, according to an embodiment of the present invention a hydraulic tire vulcanizing machine, capable of realizing self-adaptive mold adjustment without a supporting plate, includes a frame, a cross beam mechanism, and a mold mechanism. The frame includes a plurality of supporting pillars. The cross beam mechanism includes an upper cross beam and a lower cross beam. The lower cross beam is connected with the frame with the upper cross beam being in guiding connection with the lower cross beam through a mold opening and closing guiding system. The mold mechanism is arranged between the upper cross beam and the lower cross beam with the upper end and the lower end of the mold mechanism being fixedly connected with the upper cross beam and the lower cross beam respectively.

The tire vulcanizing machine includes a pulling rod mechanism comprises a plurality of groups of pulling rods, and mold locking mechanisms and hydraulic oil cylinders having the same quantity as the pulling rods. Each pulling rod comprises an upper pulling rod unit and a lower pulling rod unit which may be disconnected relative to each other. The upper pulling rod unit is fixedly connected to the upper cross beam with the lower pulling rod unit being equipped through the lower cross beam and the corresponding hydraulic oil cylinder. The mold locking mechanisms are connected to the lower pulling rod units with each mold locking mechanism comprises a driving device, a swing link, a plurality of connectors and at least one ball pin boss, wherein the driving device, the swing link, the connectors and the ball pin boss are mutually connected to each other.

Detection devices are provided for upper and lower pulling rod units connecting position. Each of the detection devices includes an impactor and a limit switch. The impactor is arranged on the upper pulling rod unit, and the limit switch is arranged on the lower pulling rod unit and electrically connected with an external control system.

According to an embodiment of the present invention, the pulling rod mechanism further comprises at least one connecting rod which is connected with two swing links between them.

According to an embodiment of the present invention, the quantity of the pulling rod is at least three and the pulling rods are uniformly arranged along the periphery of the mold mechanism.

According to an embodiment of the present invention, the lower end of the upper pulling rod unit is provided with a plurality of protruding blocks or grooves which are uniformly arranged around the axis of the upper pulling rod unit, corresponding to the protruding blocks or grooves of the upper pulling rod unit. The upper end of the lower pulling rod unit is provided with a plurality of grooves or protruding blocks which are uniformly arranged around the axis of the lower pulling rod unit. The upper pulling rod unit and lower pulling rod unit are in dismountable connection by the engagement of the protruding blocks and grooves.

According to an embodiment of the present invention, the hydraulic oil cylinder has a hollow piston, and the piston is sleeved and axially fixed to the lower pulling rod unit, a cylinder barrel of the hydraulic oil cylinder is fixedly connected to a lower flat of the lower cross beam.

According to an embodiment of the present invention, the mold locking mechanism is connected with a lower end or middle part of the lower pulling rod unit, meanwhile one end of the mold locking mechanism is further connected to the supporting pillars or the lower cross beam.

According to an embodiment of the present invention, the swing link is fixedly connected with the lower end or middle part of the lower pulling rod unit. The swing link is further fixedly connected with the ball pin boss.

According to an embodiment of the present invention, the connector comprises a pin-connected member and a hinged member with the ball pin boss comprising a pin boss and a ball arranged in the pin boss.

According to an embodiment of the present invention, one end of the driving device is rotationally connected with the supporting pillar or the lower cross beam by the hinged member, and the other end of the driving device is connected with the ball pin boss by the ball which is inserted into the ball pin boss.

According to an embodiment of the present invention, one end of the connecting rod is rotationally connected with one swing link, the other end of the connecting rod is connected with the pin-connected member, and the pin-connected member is further rotationally connected with another said swing link.

The advantages by applying the present technical solutions are set forth below.

1. According to an embodiment of the present invention, the pressurized supporting plate was removed, and the hydraulic oil cylinder was directly sleeved on the lower pulling rod units. Thus, the driving force of the hydraulic oil cylinder for the upper cross beam directly through the upper pulling rod units and the lower pulling rod units, which was to apply mold locking force to the mold, therefore, the total weight was lowered, the requirements on the precision and the cost for production was reduced as compared with the traditional tire vulcanizing machine by comprising of the pressurized supporting plate.

2. According to an embodiment of the present invention, the mold locking mechanism was arranged at the lower end or middle part of the lower pulling rod unit with the mold locking mechanism including the driving device, the connector, the connecting rod and the ball pin boss in mutual connection. The connecting rod was self-adaptable for adjustment along the X, Y and Z axes by the effects of the connector, the connecting rod and the ball pin boss, and thereby the reliability on mold locking and unlocking is further improved.

3. According to an embodiment of the present invention, the detection device for upper and lower pulling rod units connecting position was further provided with the impactor and the limit switch. The impactor was arranged on the upper pulling rod unit, and the limit switch was arranged on the lower pulling rod unit. Thus, the connection gap between the upper pulling rod unit and lower pulling rod unit was self-adaptable for adjustment by the switch, thereby a feature for the self-adaptive mold adjustment was enriched into the mold adjustment.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
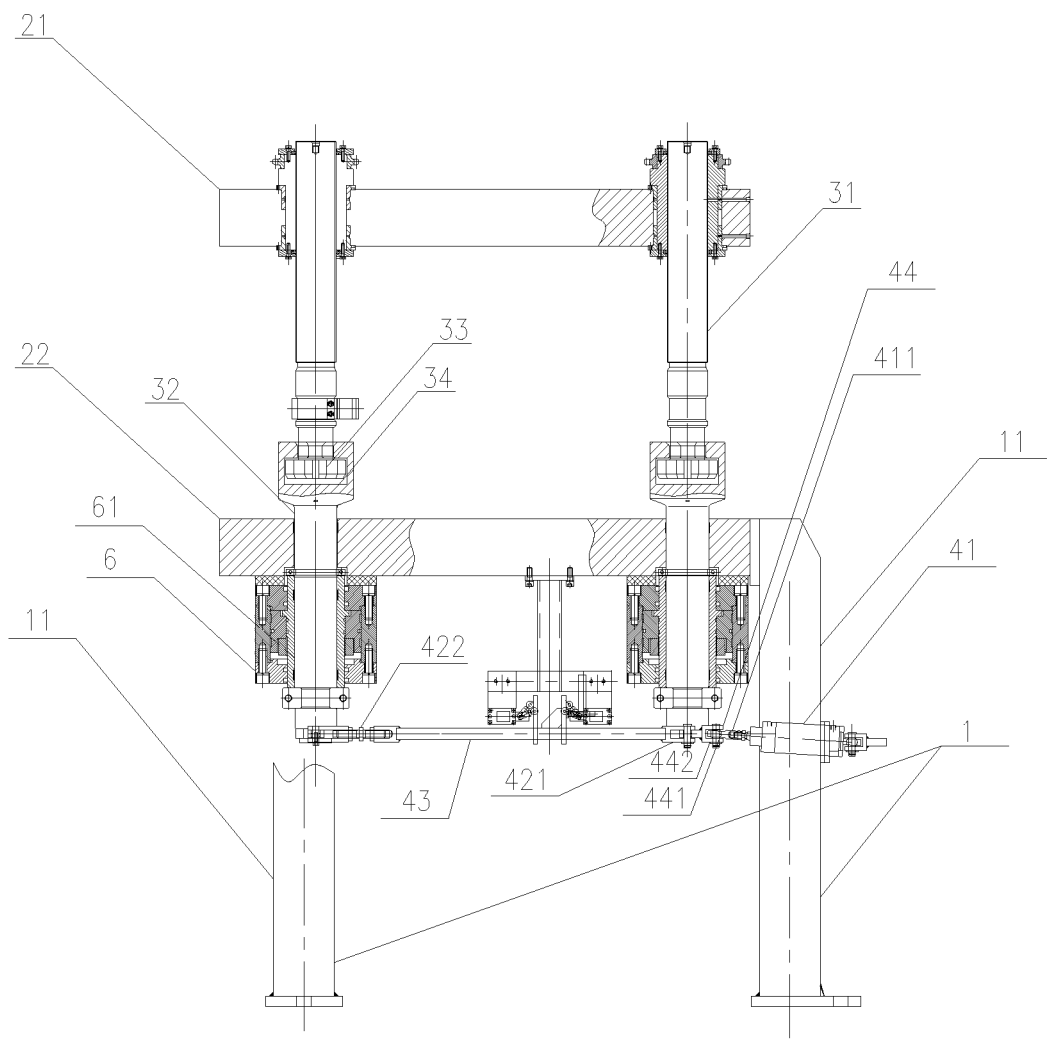
FIG. 1 is a front view of the hydraulic tire vulcanizing machine capable of realizing self-adaptive mold adjustment without a supporting plate in embodiment 1 according to the present invention.

As shown in FIG. 1, the tire vulcanizing machine in the embodiment comprises a frame 1, a cross beam mechanism and a mold mechanism 7, the frame 1 comprises a plurality of supporting pillars 11, the quantity of the supporting pillar should be changed according to the specific structure, for example, two supporting pillars 11 should be arranged to support the parts if there are two pulling rods. The cross beam mechanism comprises an upper cross beam 21 and a lower cross beam 22. The lower cross beam 22 is connected with the frame 1. More particularly the lower cross beam 22 is horizontally connected with the supporting pillars 11 of the frame 1 between them. The upper cross beam 21 is in guiding connection with the lower cross beam 22 through a mold opening and closing guiding system (not shown in the figure). The mold mechanism is arranged between the upper cross beam 21 and the lower cross beam 22 with the upper end and the lower end of the mold mechanism being fixedly connected with the upper cross beam 21 and the lower cross beam 22 respectively. The tire vulcanizing machine further comprises a pulling rod mechanism comprising four groups of pulling rods, and mold locking mechanisms 4 and hydraulic oil cylinders 6 which have the same quantity with the pulling rods. Each pulling rod comprises an upper pulling rod unit 31 and a lower pulling rod unit 32 which may be disconnected. The upper pulling rod unit 31 is fixedly connected to the upper cross beam 21 with the lower pulling rod unit 32 being equipped through the lower cross beam 22 and the corresponding hydraulic oil cylinder 6. The mold locking mechanisms 4 are connected to the lower ends or the middle parts of the lower pulling rod units 32. Each mold locking mechanism 4 comprises a driving device 41, a swing link 45, a plurality of connectors and a ball pin boss 44, the driving device 41, the swing link 45, the connectors and the ball pin boss 44 are in mutual connection. The quantity of the pulling rods could be three or more than three.

Figure 4:
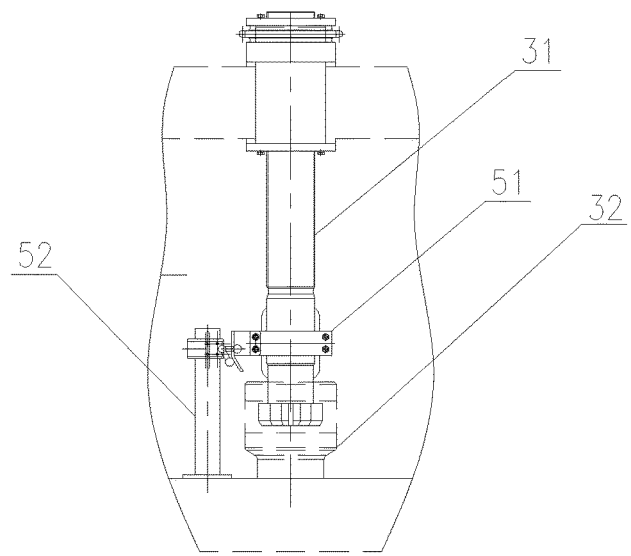
FIG. 4 illustrates the adjusting switch for an upper and lower rod connection involved in the hydraulic tire vulcanizing machine capable of realizing self-adaptive mold adjustment without a supporting plate in embodiment 1 according to the present invention.

As shown in FIG. 4, the tire vulcanizing machine further comprises detection devices for upper and lower pulling rod units connecting position comprising impactors 51 and limit switches 52. The impactors 51 are arranged on the upper pulling rod units with the limit switches 52 being arranged on the lower pulling rod units and electrically connected with an external control system. The upper pulling rod unit 31 and the lower pulling rod unit 32 are in clearance fit with a certain gap being left along the axial direction and on the sides (as shown in FIG. 1), which is to redress the errors from the adjustments of the switches. Thus, which thus makes the adjustments and motions of lock and unlock be reliable; and the external control system could be a computer or other devices as like, which is to control in automation.

The mold mechanism comprises an upper half mold and a lower half mold, hereinafter referred to as an upper mold and a lower mold. The upper mold is fixed on the upper cross beam 21, and the lower mold is fixed on the lower cross beam 22.

The pulling rod mechanism further comprises at least one connecting rod 43 which is connected with two swing links 45 between them, so that the mold locking mechanisms are combined instead of separately being arranging on the lower pulling rod units 32, which can remove the driving devices 41 set on other mold locking mechanisms. Thus, the driving force is provided by only one driving device 41 at one side, and then the mold locking mechanism at the other side is driven by the connecting rod 43. The quantity of the connecting rods depends on the quantity of the swing links 45 on the lower pulling rod units 32 and the corresponding requirements in use. For example, in the present embodiment, four swing links 45 are provide with the premise of four pulling rod units 32 being provided with every two adjacent swing links 45 but one group are connected by one connecting rod 43, then three connecting rod 43 are provided, the two swing links 45 in the group are not connected by the connecting rod 43, a driving device 41 applies a driving force to one of the two swing links 45, and then the other swing link 45 are driven by the effect of the connecting rods 43. Only one connecting rod 43 should be arranged in the case of only two swing links 45 that are need to be connected with each other.

Figure 2:
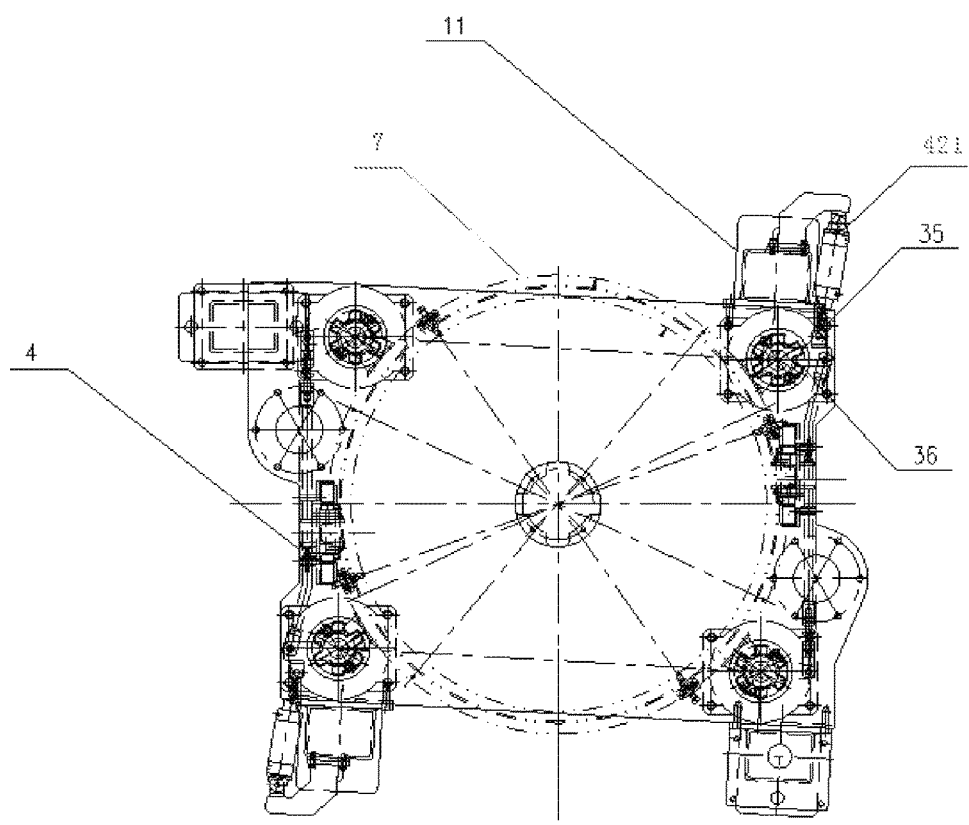
FIG. 2 is a top view of the hydraulic tire vulcanizing machine capable of realizing self-adaptive mold adjustment without a supporting plate in embodiment 1 according to the present invention.

As shown in FIG. 2, the connecting rod 43 is further designed to be bent, which is for leaving space to install other components, thus the bent connecting rod 43 makes more space than a straight one.

As shown in FIG. 2, the four pulling rods are uniformly arranged along the periphery of the mold mechanism, thus the mold is driven uniformly through the arrangement.

As shown in FIG. 1-2, the lower end of each upper pulling rod unit 31 is provided with a plurality of protruding blocks 35 which are uniformly arranged around the axis of the upper pulling rod unit 31, the protruding blocks 35 transversely extend to form connecting joints 33 at the lower end of the upper pulling rod unit 31, corresponding to the protruding blocks 35 on the upper pulling rod unit 31 with the upper end of the lower pulling rod unit 32 being provided with a plurality of grooves 36 which are uniformly arranged around the axis of the lower pulling rod unit 32. The grooves 36 transversely extend to form connecting grooves 34 inside the upper end of the lower pulling rod unit 32. The upper pulling rod unit 31 and lower pulling rod unit 32 are in dismountable connection by the engagement of the protruding blocks 35 and the grooves 36, and further by the engagement of the connecting joints 33 and the connecting grooves 34. The connecting grooves 34 are a little bigger than the connecting joints 33 according to their axial directions and peripheries, which is thus to provide guarantees for the locking and unlocking on accuracy and reliability.

As shown in FIG. 1, the piston 61 of the hydraulic oil cylinder 6 is hollow, and the piston 61 is sleeved and axially fixed to the lower pulling rod unit 32. A cylinder barrel of the hydraulic oil cylinder 6 is fixedly connected to a lower flat of the lower cross beam 22. Rotational freedom of the lower pulling rod unit is reserved to disconnect and connect (unlock and lock) the upper pulling rod unit and lower pulling rod unit.

Figure 3:
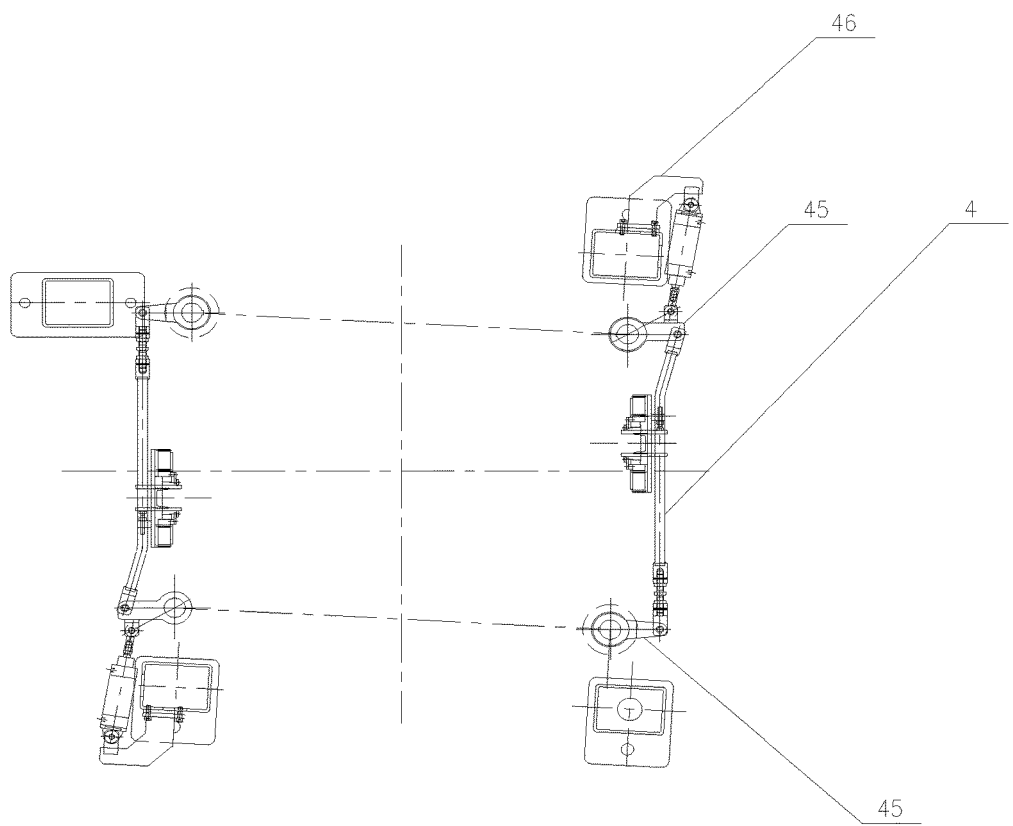
FIG. 3 illustrates the mold locking mechanism involved in the hydraulic tire vulcanizing machine capable of realizing self-adaptive mold adjustment without a supporting plate in embodiment 1 according to the present invention.

As shown in FIG. 2-3, the mold locking mechanism 4 is connected with the lower end or middle part of the lower pulling rod unit 32. One end of the mold locking mechanism 4 is further connected to the supporting pillars 11 or the lower cross beam 22.

As shown in FIG. 3, the four swing links 45 are respectively fixed to the bottoms or middle parts of the four lower pulling rod units 32 with each swing link 45 being further fixedly connected with the ball pin boss 44. The function also can be reached by directly driving the swing links 45 through the driving devices 41. The two ends of the driving device 41 should be connected with others through ball pins, each pulling rod is provide with one driving device 41.

As shown in FIG. 1-3, the connector comprises a pin-connected member 422 and a hinged member 421; the ball pin boss 44 comprises a pin boss 442 and a ball 441 arranged in the pin boss 442, the pin boss 442 has an opening on its one end, it's the opposite end is fixedly connected with the swing link 45.

As shown in FIG. 1-3, one end of the driving device 41 is rotationally connected with the supporting pillar 11 by the hinged member 421, and particularly by a corner support 46. The corner support 46 is further rotationally connected with the mold locking mechanism 4 by the hinged member 421 with the other end of the driving device 41 (i.e. piston 411) being connected with the ball pin boss 44 by the ball 441 inserted into the ball pin boss 44.

As shown in FIG. 1-3, one end of the connecting rod 43 is rotationally connected with one swing link 45, its other end is connected with the pin-connected member 422, and the pin-connected member 422 is further rotationally connected with another swing link 45.

Preferably, the driving device 41 is an air cylinder 41.

According to an embodiment of the present invention, the fixed connection could be particularly a threaded joint or another related, and the said rotational connection could be particularly a hinged joint or another related.

Due to the tire vulcanizing machine usually comprising two vulcanizing machine units arranged side-by-side, the driving device 41 could be arranged on the supporting pillar 11 shared by the two vulcanizing machine units, one end of the piston moves to bring a restoring force to its other end. Thus, the locking mechanisms 4 at two sides are driven by only one driving device 41.

A second embodiment of the present invention only different from the first embodiment with respect to the lower end of the upper pulling rod unit 31 being provided with a plurality of grooves which are uniformly arranged around the axis of the upper pulling rod unit 31, the grooves transversely extend to form connecting grooves inside the lower end of the upper pulling rod unit 31, corresponding to the grooves of the upper pulling rod unit 31, the upper end of the lower pulling rod unit 32 is provided with a plurality of protruding blocks which are uniformly arranged around the axis of the lower pulling rod unit 32, the protruding blocks transversely extend to form connecting grooves 34 at the upper end of the lower pulling rod unit 32, wherein the connecting grooves 34 are also a little bigger than the connecting joints 33 according to their axial directions and peripheries, which is thus to provide guarantees for the unlocking on accuracy.

In one case of applying mold locking forces, when the hydraulic oil cylinders 6 sleeved on the lower pulling rod units 32 supplies a driving force to the lower pulling rod units 32, then the upper pulling rod units 31 connected with the lower pulling rod units 32 drives the upper cross beam 21 in a downward direction wherein the mold locking force is applied to the mold. The driving device 41 of the mold locking mechanism 4 pushes the ball pin boss 44 connected with it in a forward direction, because the piston 411 is inserted into the ball 441. Thus, the mold locking mechanism 4 can be self-adaptive by the ball 441, to thereby drive the lower pulling rod units to rotate, which is thus to connect or disconnect the upper pulling rod units and the lower pulling rod units. The mold locking force can be applied only in the case wherein the upper pulling rod units are connecting with the lower pulling rod units. The mold locking mechanisms 4 are further provided with a plurality of hinged members and/or pin-connected members, so that the mold locking mechanisms 4 can self-adapt the up-and-downward movements of the ends of lower pulling rod units by the mold locking forces. The impactors are arranged on the upper pulling rod units cooperate with the limit switches arranged on the lower pulling rod units, which is to turn on and off the switches, and the connection gaps between the upper pulling rod units and the lower pulling rod units are detected by the switches.

The advantages by applying the present technical solutions are as below:

1. According to an embodiment of the present invention, the pressurized supporting plate was removed, and the hydraulic oil cylinder was directly sleeved on the lower pulling rod units. Thus, the driving force of the hydraulic oil cylinder drives the upper cross beam directly through the upper pulling rod units and the lower pulling rod units, which was to apply a mold locking force to the mold. Therefore, the total weight was lowered. Thus, the requirements on the precision and the cost for production was reduced as compared with the traditional tire vulcanizing machine that includes the pressurized supporting plate.

2. According to an embodiment of the present invention, the mold locking mechanism was arranged at the lower end or middle part of the lower pulling rod unit, the mold locking mechanism includes the driving device, the connector, the connecting rod and the ball pin boss in mutual connection. The connecting rod was self-adaptable for adjustment along the X, Y and Z axis by the effects of the connector, the connecting rod and the ball pin boss, and thereby the reliability on mold locking and unlocking is further improved.

3. According to an embodiment of the present invention, the detection device for upper and lower pulling rod units connecting position was further provided, which includes the impactor and the limit switch, the impactor was arranged on the upper pulling rod unit, and the limit switch was arranged on the lower pulling rod unit. Thus, the connection gap between the upper pulling rod unit and lower pulling rod unit was self-adaptable for adjustment by the switch, and thereby a feature for self-adaptive mold adjustment was enriched into the mold adjustment.

The above are only the preferred embodiments of the present invention, and what should be notified is that any changes and improvements belong to the scope claimed to protect in this invention on the premise of innovation driven by the present invention for the skilled person in this field.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hydraulic tire vulcanizing machine capable of realizing self-adaptive mold adjustment without a supporting plate comprises a frame, a cross beam mechanism, and a mold mechanism, the frame comprises a plurality of supporting pillars, the cross beam mechanism comprises an upper cross beam and a lower cross beam, the lower cross beam is connected with the frame, the upper cross beam is in guiding connection with the lower cross beam, the mold mechanism is arranged between the upper cross beam and the lower cross beam, the upper end and the lower end of the mold mechanism are fixedly connected with the upper cross beam and the lower cross beam respectively, the tire vulcanizing machine is characterized by further comprising:

a pulling rod mechanism comprising a plurality of groups of pulling rods, a plurality of mold locking mechanisms and a plurality of hydraulic oil cylinders, wherein both of a quantity of the plurality of hydraulic oil cylinders and a quantity of the plurality of mold locking mechanisms are the same as a quantity of the plurality of groups of pulling rods;

each group of pulling rods comprising an upper pulling rod unit and a lower pulling rod unit which may be disconnected relative to each other, wherein the upper pulling rod unit is fixedly connected to the upper cross beam, and the lower pulling rod unit is equipped through the lower cross beam and the corresponding hydraulic oil cylinder;

mold locking mechanisms connected to the lower pulling rod units, wherein each mold locking mechanism comprises a driving device, a swing link, a plurality of connectors and at least one ball pin boss, wherein the driving device, the swing link, the connectors and the ball pin boss are in mutual connection; and detection devices for detecting a connecting position between the upper and lower pulling rod units, wherein each of the detection devices comprise an impactor and a limit switch, the impactor is arranged on the upper pulling rod unit, and the limit switch is arranged on the lower pulling rod unit.

2. The tire vulcanizing machine according to claim 1, wherein the pulling rod mechanism further comprises at least one connecting rod connected with two swing links between them.

3. The tire vulcanizing machine according to claim 1, wherein the quantity of the plurality of groups of pulling rods is at least three, and the pulling rods are uniformly arranged along the periphery of the mold mechanism.

4. The tire vulcanizing machine according to claim 1, wherein the lower end of the upper pulling rod unit is provided with a plurality of protruding blocks or grooves uniformly arranged around the axis of the upper pulling rod unit, corresponding to the protruding blocks or grooves of the upper pulling rod unit, the upper end of the lower pulling rod unit is provided with a plurality of grooves or protruding blocks which are uniformly arranged around the axis of the lower pulling rod unit and the upper pulling rod unit and lower pulling rod unit are in dismountable connection by the engagement of the protruding blocks and grooves.

5. The tire vulcanizing machine according to claim 1, wherein the hydraulic oil cylinder has a hollow piston, and the piston is sleeved and axially fixed to the lower pulling rod unit, a cylinder barrel of the hydraulic oil cylinder is fixedly connected to a lower flat of the lower cross beam.

6. The tire vulcanizing machine according to claim 1, wherein the mold locking mechanism is connected with a lower end or middle part of the lower pulling rod unit, meanwhile one end of the mold locking mechanism is further connected to the supporting pillars or the lower cross beam.

7. The tire vulcanizing machine according to claim 1, wherein the swing link is fixedly connected with the lower end or middle part of the lower pulling rod unit, and the swing link is further fixedly connected with the ball pin boss.

8. The tire vulcanizing machine according to claim 2, wherein the swing link is fixedly connected with the lower end or middle part of the lower pulling rod unit, and the swing link is further fixedly connected with the ball pin boss.

9. The tire vulcanizing machine according to claim 3, wherein the swing link is fixedly connected with the lower end or middle part of the lower pulling rod unit, and the swing link is further fixedly connected with the ball pin boss.

10. The tire vulcanizing machine according to claim 4, wherein the swing link is fixedly connected with the lower end or middle part of the lower pulling rod unit, and the swing link is further fixedly connected with the ball pin boss.

11. The tire vulcanizing machine according to claim 5, wherein the swing link is fixedly connected with the lower end or middle part of the lower pulling rod unit, and the swing link is further fixedly connected with the ball pin boss.

12. The tire vulcanizing machine according to claim 6, wherein the swing link is fixedly connected with the lower end or middle part of the lower pulling rod unit, and the swing link is further fixedly connected with the ball pin boss.

13. The tire vulcanizing machine as claimed in claim 1, wherein each of the plurality of connectors comprises a pin-connected member and a hinged member, and the ball pin boss comprises a pin boss and a ball arranged in the pin boss.

14. The tire vulcanizing machine as claimed in claim 13, wherein one end of the driving device is rotationally connected with the supporting pillar or the lower cross beam by the hinged member, and the other end of the driving device is connected with the ball pin boss by the ball which is inserted into the ball pin boss.

15. The tire vulcanizing machine as claimed in claim 13, wherein the pulling rod mechanism further comprises at least one connecting rod connected with two swing links and disposed therebetween, and wherein one end of the connecting rod is rotationally connected with one said swing link, the other end of the connecting rod is connected with the pin-connected member, and the pin-connected member is further rotationally connected with another said swing link.

* * * * *